United States Patent
Hishinuma (10) Patent No.: US 11,190,657 B2
(45) Date of Patent: Nov. 30, 2021

(54) DOCUMENT CONVEYING APPARATUS, IMAGE READING APPARATUS, AND IMAGE FORMING APPARATUS

(71) Applicant: CANON KABUSHIKI KAISHA, Tokyo (JP)

(72) Inventor: Norikazu Hishinuma, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/159,306

(22) Filed: Jan. 27, 2021

(65) Prior Publication Data

US 2021/0250454 A1   Aug. 12, 2021

(30) Foreign Application Priority Data

Feb. 7, 2020   (JP) .............................. JP2020-020189

(51) Int. Cl.
 *H04N 1/00* (2006.01)
 *B65H 3/06* (2006.01)
 *B65H 5/06* (2006.01)

(52) U.S. Cl.
 CPC ....... *H04N 1/00559* (2013.01); *B65H 3/0669* (2013.01); *B65H 5/062* (2013.01);
 (Continued)

(58) Field of Classification Search
 CPC .... B65H 3/0669; B65H 3/0684; B65H 5/062; B65H 1/04; B65H 1/08; B65H 1/14; B65H 2301/3613; B65H 2301/44324; B65H 2403/724; B65H 2403/732; B65H 2404/1424; B65H 2404/1441; B65H 2407/21; B65H 2511/242; B65H 2515/32; B65H 2515/322; B65H 2801/06; B65H 29/14; B65H 3/0638; B65H 3/0661; B65H 3/0676; B65H 3/5223; B65H 3/5261; B65H 7/06; B65H 7/10; B65H 7/14;
 (Continued)

(56) References Cited

U.S. PATENT DOCUMENTS 7,887,042 B2 * 2/2011 Sheng .................... B65H 3/523
                                                        271/121
8,688,008 B2 * 4/2014 Norioka ............. G03G 15/0173
                                                        399/167

(Continued)

FOREIGN PATENT DOCUMENTS

JP          2020-001872 A       1/2020

*Primary Examiner* — Negussie Worku
(74) *Attorney, Agent, or Firm* — Venable LLP (57) ABSTRACT

A document conveyance apparatus includes a feed roller, a first and a second conveyance rollers, a conveyance shaft, an arm portion rotatably moving the feed roller to a standby position to a feeding position, a transmission portion transmitting rotation of the conveyance roller shaft to the arm portion, and a torque limiter. The feed roller and the first conveyance roller rotate in a conveyance direction when the conveyance roller shaft rotates in a first direction, and the feed roller moves from a feeding position to a standby position when the conveyance roller shaft rotates in a second direction. When a document fed by the second conveyance roller moves through a nip portion, a transmission portion does not transmit rotation of the first conveyance roller rotated in the second direction by the separation roller to an arm portion by operation of the torque limiter.

10 Claims, 10 Drawing Sheets

(52) U.S. Cl.
CPC ..... *H04N 1/00572* (2013.01); *H04N 1/00602* (2013.01); *B65H 2515/32* (2013.01)

(58) Field of Classification Search
CPC .......... B65H 9/002; B65H 9/006; B41J 11/42; G05D 17/02; H04N 1/0057; H04N 1/0071; H04N 1/00718; H04N 1/3878; H04N 5/32; H04N 5/361; G01N 23/043; G01T 1/247
USPC ....................................................... 358/498
See application file for complete search history.

(56) References Cited

U.S. PATENT DOCUMENTS

| | | | |
|---|---|---|---|
| 10,392,211 | B2 | 8/2019 | Hishinuma |
| 10,906,760 | B2* | 2/2021 | Tateishi ............... B65H 3/0669 |
| 2020/0010295 | A1 | 1/2020 | Hishinuma |
| 2020/0198908 | A1* | 6/2020 | Shimosaka .......... B65H 3/0661 |
| 2020/0385226 | A1 | 12/2020 | Hishinuma et al. |
| 2021/0188575 | A1* | 6/2021 | Umi ..................... B65H 3/0669 |
| 2021/0188576 | A1* | 6/2021 | Umi ..................... B65H 3/0669 |

* cited by examiner

DOCUMENT CONVEYING APPARATUS, IMAGE READING APPARATUS, AND IMAGE FORMING APPARATUS

FIELD OF THE INVENTION AND RELATED ART

The present invention relates to a document conveying apparatus for conveying documents which are in the form of a sheet of recording medium, an image reading apparatus having a document conveying apparatus, and an image forming apparatus having an image reading apparatus.

There have been known such image forming apparatuses as a copying machine, a printing machine, a facsimileing machine, etc., that have a document feeding apparatus (which hereafter may be referred to as an ADF) (Automatic Document Feeder) which automatically feeds documents which are in the form of a sheet of recording medium, into the main assembly of an image reading apparatus. The ADF disclosed in Japanese Laid-open Patent Application No. 2020-001872 is provided with a feed roller for feeding the documents in its document tray into its main assembly, a conveyance roller for conveying the documents as the documents are fed into the main assembly, a separation roller which remains pressured toward the conveyance roller and is rotated by the rotation of the conveyance roller, and a torque limiter for controlling the separation roller in the amount of rotational force which the separation roller is subjected.

Further, there have been known various mechanisms for rotationally driving a combination of a feed roller and a conveyance roller. From the standpoint of cost reduction, some of these mechanisms are structured so that while a motor rotates in the positive direction, they rotationally drive the combination of a feed roller and a conveyance roller, whereas as the motor rotates in reverse, they move the feed roller to the standby position, in which the feed roller remains separated from the document in the document tray, and the feeding position in which the feed roller remains in contact with the top document in the document tray. More specifically, as a job is started, these mechanisms move the feed roller from the standby position to the feeding position, whereas as soon as the job is completed, they move the feed roller back into the standby position. That is, in order to control the ADF in the timing with which the documents in the document tray are fed into the main assembly, the motor is stopped or rotated while the feed roller is kept in the feeding position.

The documents feeding apparatuses structured as described above, however, will possibly suffer from the following issue: A feed roller is repeatedly rotated or stopped to adjust the ADF in the document feeding timing. Thus, it sometimes occur that as soon as the feed roller is stopped, the force borne by the torque limiter works in the direction to reversely rotate the separation roller, causing the separation roller to rotate in the opposite direction from the document conveyance direction. As the separation roller is rotated in the opposite direction from the document conveyance direction, it moves the feed roller upward from the feeding position. Therefore, as the next document begins to be fed, the feed roller moves downward into the feeding position, making it possible for the feed roller to generate banging noises by colliding with the documents in the document tray, and/or document tray.

SUMMARY OF THE INVENTION

Thus, the primary object of the present invention is to provide a document feeding apparatus which is unlikely to generate banging noises which are attributable to the quick downward movement of the feed roller, an image reading apparatus having such a document feeding apparatus, and an image forming apparatus having an image reading apparatus having such a document feeding apparatus.

According to an aspect of the present invention, there is provided a document conveying apparatus comprising: a document placement portion configured to place documents; a feed roller configured to feed the document by rotating in contact with a surface of the documents placed said on the document placement portion; a first conveyance roller configured to covey the documents fed by the feed roller; a conveyance roller shaft configured to rotatably support the first conveyance roller; an arm portion, provided rotatably about the conveyance roller shaft, configured to rotatably move the feed roller to a standby position where the feed roller is away from the document placed on the document placement portion and to a feeding position where the feed roller is contact with and feeds the document placed on the document placement portion; a transmission portion, provided between the conveyance roller shaft and the arm portion, configured to transmit rotation of the conveyance roller shaft to the arm portion; a separation roller, forming a nip portion by pressing on the first conveyance roller, configured to separate the document fed by the feed roller; torque limiter configured to apply a load to rotation of the separation roller; and a second conveyance roller configured to convey the document separated by the first conveyance roller and the separation roller; wherein the feed roller and the first conveyance roller rotate in a conveyance direction of the document when the conveyance roller shaft rotates in a first direction, and the feed roller moves from the feeding position to the standby position when the conveyance roller shaft rotates in a second direction opposite to the first direction, and wherein when a rear edge of the document fed by the second conveyance roller and rotating the separation roller in a predetermined direction moves through the nip portion, the transmission portion does not transmit rotation of the first conveyance roller rotated in the second direction by the separation roller rotating in a opposite direction opposite to the predetermined direction to the arm portion by operation of the torque limiter.

Further features of the present invention will become apparent from the following description of exemplary embodiments (with reference to the attached drawings).

BRIEF DESCRIPTION OF THE DRAWINGS

Parts (a) and (b) of FIG. 4 are perspective views of the feed roller unit and separation roller units, respectively, of the ADF in the preferred embodiment.

Parts (a) to (c) of FIG. 7 are side views of the combination of the conveyance roller and separation roller of the ADF in the preferred embodiment, before the documents in the document tray begin to be fed, while a document is moving through the separation nip, and right after the passage of a document through the nip, respectively.

Parts (a) to (c) of FIG. 9 are side views of the combination of the conveyance roller and separation roller of the example of comparative ADF, before the documents in the document tray begin to be fed, while a document is moving through the separation nip, and right after the passage of the rear edge of the document through the nip, respectively.

DESCRIPTION OF THE EMBODIMENTS

Hereinafter, one of the preferred embodiments of the present invention is described with reference to the appended drawings.

[Image Forming Apparatus]

Figure 1:
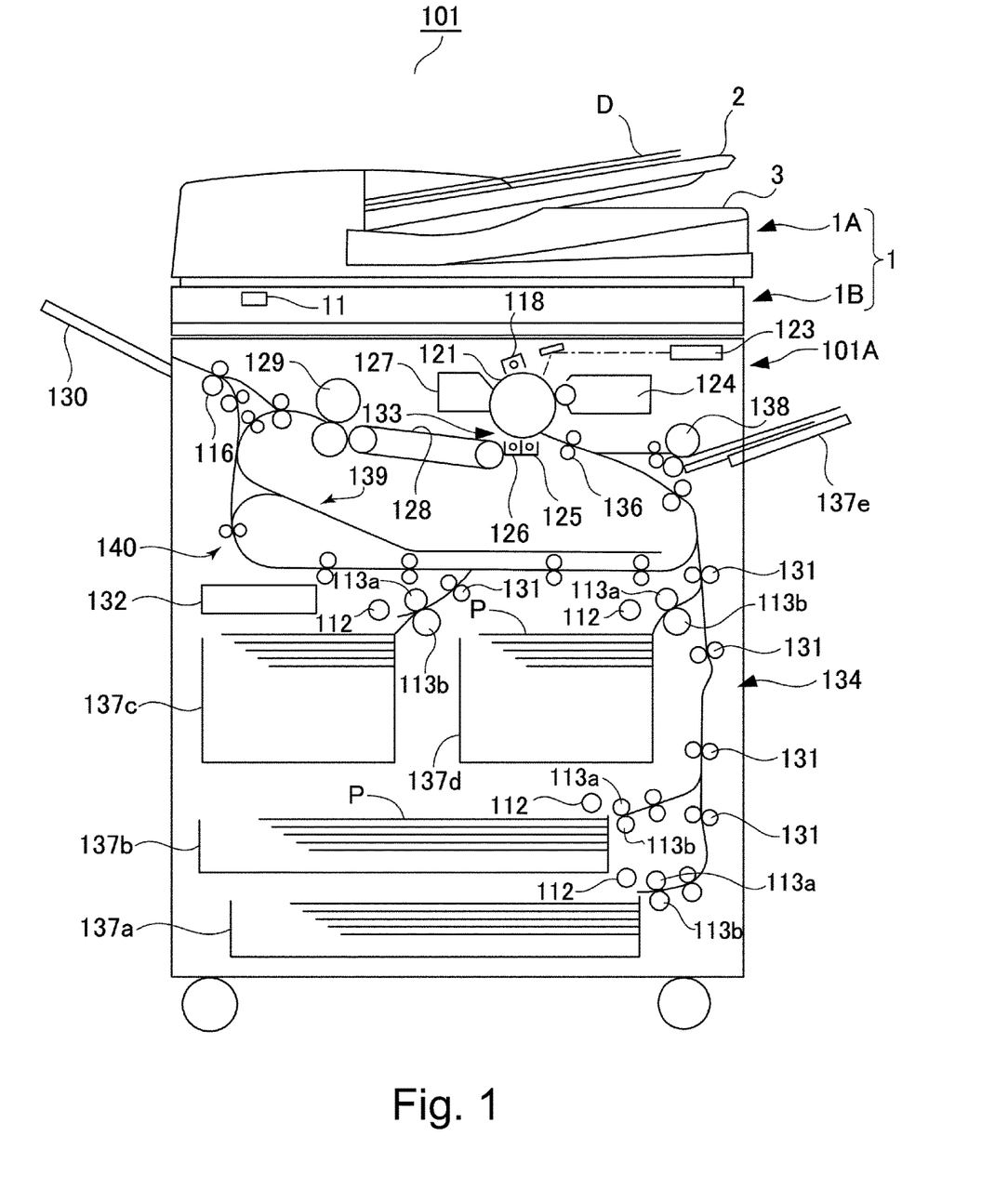
FIG. 1 is a schematic sectional view of the image forming apparatus in one of the preferred embodiments of the present invention.

To begin with, referring to FIG. 1, a printer 101, which is an example of image forming apparatus which is in accordance with the present invention, is described. Referring to FIG. 1, the printer 101 is a multi-functional machine having the main assembly 101A and an image reading apparatus 1. The main assembly 101A forms an image on a sheet P of recording medium as a recording medium. The image reading apparatus 1 is positioned on top of the main assembly 101A. It has the main assembly 1B, and an ADF 1A. It obtains the information of a document D by optically scanning the surface of the document D, on which an image is present. Recording media for a document include paper such as thin paper and cardstock, plastic film or the like for an overhead projector or the like, coated paper or the like which were treated across its surfaces, an envelop or the like having a specific shape, fabric, etc.

The main assembly 101A has: an image forming portion 133; and a sheet delivering portion 134 which delivers a sheet P of recording medium to the image forming portion 133. The sheet delivering portion 134 has sheet storing portions 137a, 137b, 137c and 137d, which are different in the size of the sheets they can store. The sheets in each sheet storing portion are nudged out of the storing portion by a pickup roller 112, are separated from the sheets on the underside, by the coordination of the feed roller 113a and a retard roller 113b, and are delivered to the corresponding pair of conveyance rollers 131. Then, each sheet P is delivered to multiple conveyance roller pairs 131, which are disposed one after another along the sheet conveyance passage. Eventually, it is delivered to a registration roller pair 136.

By the way, as a sheet P of recording medium is placed in a manual feeder tray 137e by a user, the sheet P is fed into the main assembly 101A by a feed roller 138. Then, it is conveyed to the registration roller pair 136. The registration roller pair 136 temporarily holds each sheet P by the leading edge of the sheet P to correct the sheet P in attitude, and then, restarts conveying the sheet P in synchronism with the progression of the image formation operation, that is, the process carried out by the image forming portion 133 to form a toner image.

The image forming portion 133 forms an image on a sheet P of recording medium. It is an electrophotographic image formation unit, it is provided with a photosensitive drum 121, which is a photosensitive member. The photosensitive drum 121 is rotatable in such a direction that its portion which is adjacent to the sheet conveyance passage moves in the same direction as the sheet conveyance direction. The image forming portion 133 is provided with a charging device 118, an exposing apparatus 123, a developing device 124, a transfer charging device 125, a separation charging device 126, and a cleaner 127, which are disposed in the adjacencies of the peripheral surface of the photosensitive drum 121. The charging device 118 uniformly charges the peripheral surface of the photosensitive drum 121. The exposing apparatus 123 forms an electrostatic latent image on the peripheral surface of the photosensitive drum 121 by exposing the peripheral surface of the photosensitive drum 121 in accordance with the information of the image to be formed, which is inputted from the image reading apparatus 1 or the like.

The developing device 124 is holding two-component developer which is made up of toner and carrier. It develops the electrostatic latent image by supplying the photosensitive drum 121 with charged toner. As a sheet P of recording medium is delivered from the registration roller pair 136, the toner image on the photosensitive drum 121 is transferred onto the sheet P of recording medium by a bias electric field generated by the transfer charging device 125. After the transfer of the toner image onto the sheet P, the sheet P is separated from the photosensitive drum 121 by the bias electric field generated by the separation charging device 126. Then, the sheet P is conveyed toward the fixing portion 129 by a pre-fixation conveying portion 128. By the way, the adherents such as the toner (transfer residual toner) which failed to be transferred onto the sheet P, and therefore, remaining on the photosensitive drum 121, are removed by the cleaner 127 to prepare the photosensitive drum 121 for the next image forming operation.

After the conveyance of the sheet P to the fixing portion 129, the sheet P is conveyed through the fixing portion 129 while remaining sandwiched and heated by the pair of rollers of the fixing portion 129. Thus, the toner image on the sheet P melts, and then, solidifies as it cools. That is, the toner image becomes fixed to the sheet P. After the fixation of the toner image to the sheet P, the sheet P is discharged by the discharge roller pair 116, into a delivery tray 130, which is protrusive outward of the main assembly 101a. In a case where the image forming apparatus 101 is in the two-sided printing mode, in which two (first and second) images are formed on both surfaces of the sheet P, one for one, after the formation of the first image on one of the two surfaces of the sheet P, the sheet P is conveyed through an inverting portion 139, being thereby put upside-down, after being put through the fixing portion 129. Then, the sheet P is conveyed by a two-sided mode sheet conveying portion 140, to the registration roller pair 136. Then, the second image is formed on the back surface of the sheet P by the image forming portion 133. Then, the sheet P is discharged into the delivery tray 130.

The image forming portion 133 described above is an example of image forming portion which forms an image on a sheet of recording medium, based on the information of an image to be formed, which is obtained from a document D (original) by the image reading apparatus 1. By the way, not only is the present invention applicable to an image forming portion which employs an image forming method of the so-called intermediary transfer type, which transfers an image onto a sheet (P) of recording medium by way of an intermediary transferring member, but also, an image forming apparatus which employs one of other image forming method than the intermediary transfer type. For example, the present invention is also compatible with image forming apparatuses of the inkjet type and off-set printing type.

[Image Reading Apparatus]

Figure 2:
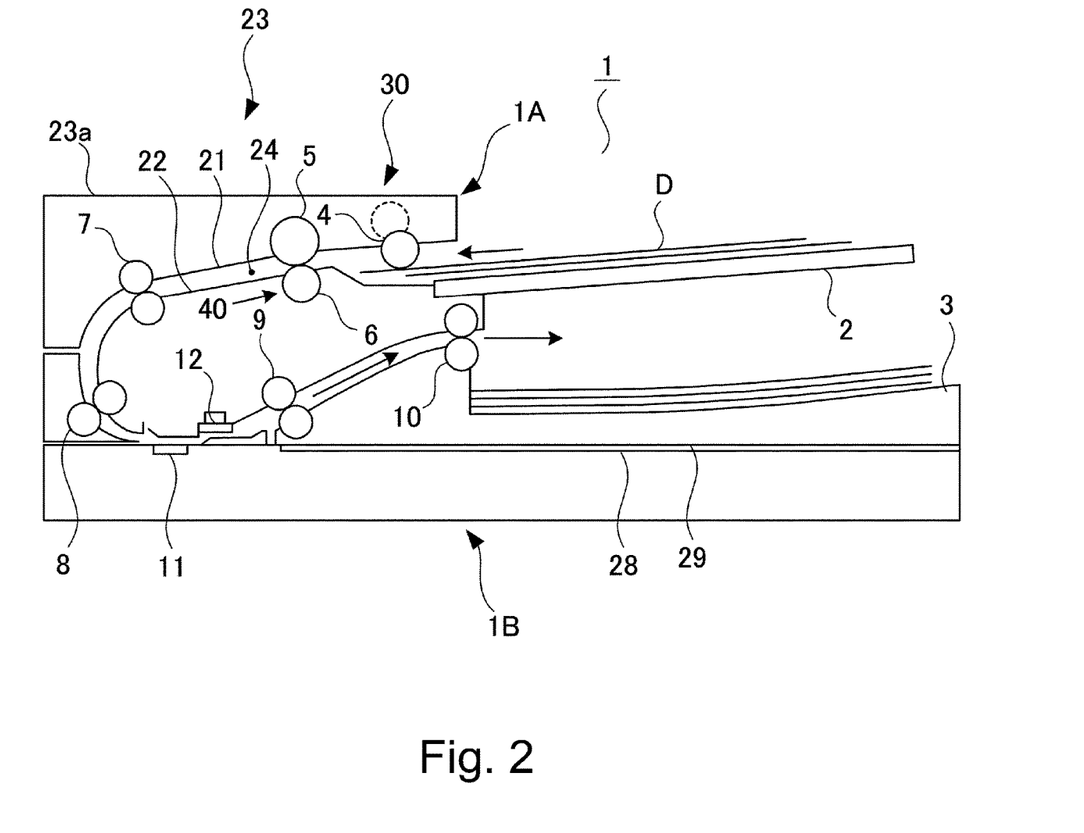
FIG. 2 is a schematic sectional view of the image reading apparatus in the preferred embodiment.

Next, referring to FIG. 2, the image reading apparatus 1 is described about its structure. Referring to FIG. 2, The image reading apparatus 1 comprises the main assembly 1B, and the ADF 1A which is an example of sheet conveying apparatus. Further, the image reading apparatus 1 has the first reading portion 11 which is disposed in the main assembly 1B, and the second reading portion 12 which is disposed in the ADF 1A. Next, the image reading apparatus 1 is described about its various elements, of which it is made up.

The first reading portion 11 obtains the information of the image of one (first surface) of two surfaces of a document D (original) by reading the first surface. The second reading portion 12 obtains the information of the other (second) surface of the document D (original) by reading the second surface. Each of the first and second reading portions 11 and 12 has an exposure lamp for shedding light upon the document D, an image sensor which is a photoelectric conversion element, unshown mirrors and lenses, etc. The light shed from the exposure lamp is reflected by the document D. Then, it is focused on the image sensor by way of the mirrors and lenses, being thereby converted into electrical voltage, or the data of the image to be formed. The image data obtained by the first reading portion 11 and/or second reading portion 12 are transmitted to the control portion 132 of the main assembly 101A of the image reading apparatus 101. However, it does not always occur that the first and second surfaces of the document D are simultaneously read by the first and second reading portions 11 and 12. That is, it is possible that only one surface of the document D will be read.

The main assembly 1B of the image reading apparatus 1 is fixed to the top surface of the main assembly 101A of the printer 101 (FIG. 1). The main assembly 1B is provided with a document placement platen 28 of the so-called flat bed type, which makes up the top portion of the first reading portion 11. The first reading portion 11 is supported by a carriage (unshown) which is movable in the left-right direction of the FIG. 1, being enabled to move across the entire range of the document placement platen 28, from the position shown in FIG. 2.

The ADF 1A is hinged to the reading section 1 with the use of an unshown hinging mechanism which is attached to the rear edge portion (FIG. 1) of the main assembly 1B of the reading section 1, being thereby enabled to vertically pivot relative to the main assembly 1B. Further, the main assembly 1B is provided with a document pressing plate 29, which faces the document placement platen 28. The ADF 1A is also provided with a document tray 2, a document conveying portion 23, and the delivery tray 3, in addition to the second reading portion 12. The document tray 2 is an example of sheet placement portion for supporting documents, which are in the form of a sheet, after the placement of documents in the ADF 1A. The document conveying portion 23 has an internal document conveyance passage 24. It conveys the documents D in the document tray 2 to the first and second reading portions 11 and 12 through its document conveyance passage 24. The first and second reading portions 11 and 12 are examples of image reading portion, which obtain the information of the document D by reading the document D while the document D is conveyed by the ADF 1A. After the information of the image of the document D is obtained by the first and second reading portions 11 and 12, the document D is discharged into the delivery tray 3.

Next, the document conveying portion 23 is described in detail. The document conveying portion 23 has a pickup roller 4, a feed roller 5, a separation roller 6, a registration roller pair 7, a conveyance roller pair 8, a conveyance roller pair 9, and a discharge roller pair 10. These rollers are positioned in the listed order, in terms of the direction (which hereafter will be referred to as document conveyance direction) in which the document D is moved through the document conveyance passage 24. By the way, the delivery tray 3 is positioned below the document tray 2. The document conveyance passage 24 has a U-shaped curvature as it is seen from the widthwise direction the document D (FIG. 2), which is perpendicular to the sheet conveyance direction. The document conveying portion 23 has a cover 23a which makes up the top portion of the document conveying portion 23. This cover 23a is pivotally movable. It can be pivotally opened to replace the pickup roller 4, and also, to take care of a jammed document.

The pickup roller 4 in this embodiment is an example of feed roller for feeding a document D into the main assembly of an ADF. It feeds the topmost document D in the document tray 2 into the main assembly of the ADF by coming into contact with the top surface of the topmost document D. The feed roller 5 is an example of the first conveying roller. The combination of the feed roller 5 and separation roller 6 conveys the document D, which it receives from the pickup roller 4, downstream in terms of the document conveyance direction, while separating the topmost document D from the documents D which it receives from the pickup roller 4. The separation roller 6 remains pressed upon the feed roller 5. It is fitted around a stationary shaft, with the placement of a torque limiter between it and the shaft. By the way, the application of the present invention is not limited to an ADF which is structured so that the separation roller 6 is fitted around the stationary shaft, with the placement of the torque limiter between the separation roller 6 and stationary shaft. That is, the present invention is also compatible with an ADF of the so-called retard type, which is structured so that rotational driving force, which is opposite in direction from the document conveyance direction, is inputted into the separation roller 6 by way of a torque limiter.

In this embodiment, the document conveying portion 23 has: a pickup roller unit 30 which includes the pickup roller 4 and feed roller 5; and a separation roller unit 40 which includes the separation roller 6. The pickup roller unit 30 and separation roller unit 40 are described later in detail.

The registration roller pair 7 in this embodiment, which is a registering means, corrects a document D in attitude, by catching the document D by the downstream edge (which hereafter may be referred to as "leading edge") of the document D, by its nip; as the document D is caught by the nip of the registration roller pair 7 while the registration roller pair 7 is remaining stationary, the document D is force to bend, and therefore, the document D is corrected in attitude by its own resiliency. After the correction of the document D in attitude, the registration roller pair 7 further conveys the document D through the bend portion of the document conveyance passage 24. After being further conveyed by the registration roller pair 7, the document D is conveyed further by the document conveying roller pair 8, Then, the image of the top surface of the document D, and the image of the bottom surface of the document D, are read by the first and second reading portions 11 and 12, respectively. After the reading of the document D, the document D is given to the document conveying roller pair 9, and then, to the discharge roller pair 10, by which the document D is discharged into the delivery tray 3.

By the way, the image reading apparatus 1 described above was in connection to the main assembly 101A of a printer 101. However, the image reading apparatus 1 is also independently usable from an image forming apparatus. In a case where the image reading apparatus 1 is independently used from an image forming apparatus, the information of the images read by the first and second reading portions 11 and 12 is transmitted to an external computer by way of a wired or wireless communicating means, or stored in the internal storing apparatus of the image reading apparatus 1, from which it is transmitted to a storing medium, or an external computer. Further, regarding the structure of the image reading apparatus 1, the application of the present invention is not limited to the image reading apparatus 1 structured so that it can simultaneously read both surfaces of a document D by its two image reading portions (11 and 12). That is, it is also applicable to an image reading apparatus having only one of the two reading portions.

[Pickup Roller Unit and Separation Roller Unit]

Next, referring to FIGS. 2-5, the pickup roller unit 30 and separation roller unit 40 are described about their structure. Referring to FIG. 2, the pickup roller unit 30 includes the pickup roller 4 and feed roller 5. It is attached to the cover 23a of the document conveying portion 23, which can be opened or closed. As the cover 23a is opened or closed, the pickup roller unit 30 moves with the cover 23a.

Figure 3:
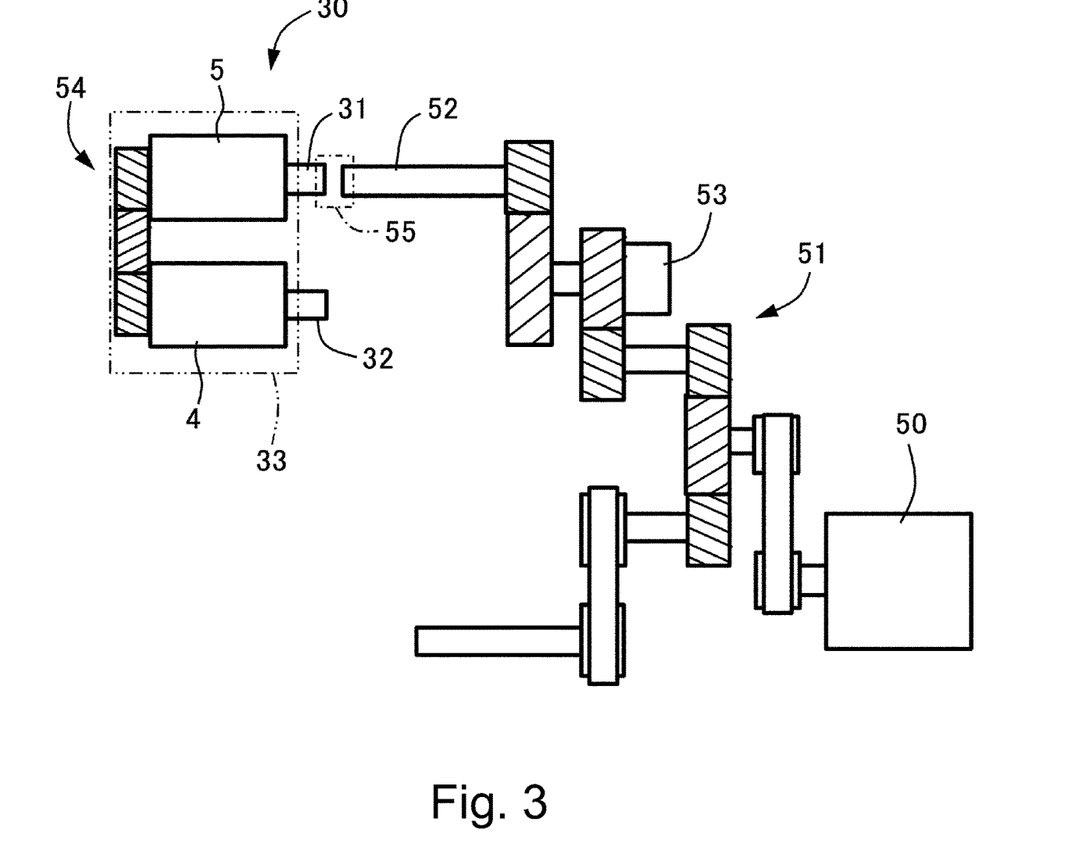
FIG. 3 is a schematic drawing of the driving system (drive train) of the ADF in the preferred embodiment.
Figure 4:
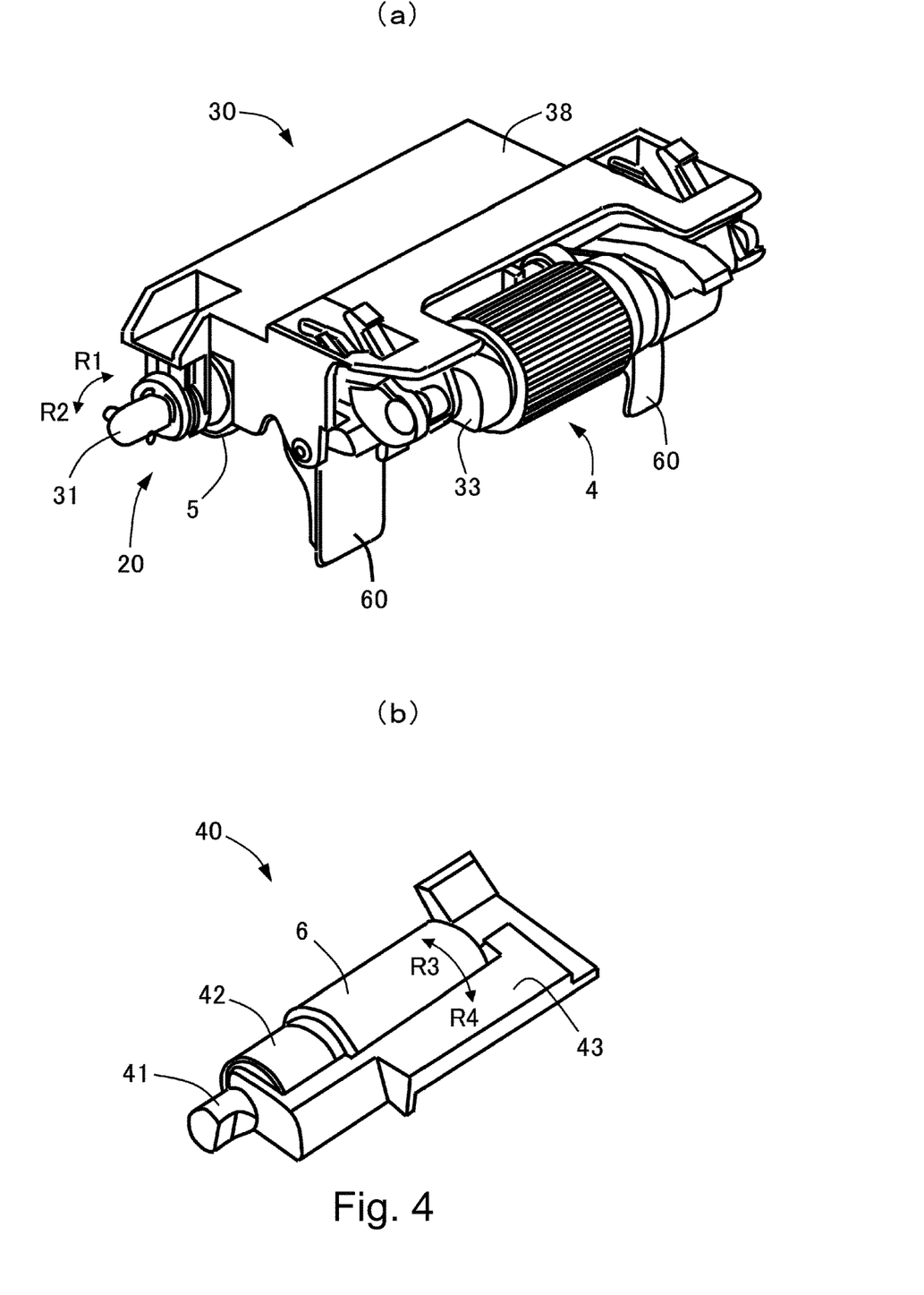

FIG. 3 is a schematic drawing of the system for driving the pickup roller unit 30. The pickup roller unit 30 is driven by the driving system, with which the document conveying portion 23 is provided. In this embodiment, the system for driving the pickup roller unit 30 is structured so that the driving force is transmitted from a document feeder motor 50, which is a driving force source, to an output shaft 52 by way of a gear train 51. The gear train 51 is provided with an electromagnetic clutch 53. The portion of the gear train 51, which is on the downstream side of the electromagnetic clutch 53, can be changed in the state of its rotation; it can be made to rotate or stop rotating, by the engagement or disengagement, respectively, of the electromagnetic clutch 53. The engagement and disengagement of the electromagnetic clutch 53 are controlled by the control portion 132 (FIG. 1) so that as documents D are fed into the main assembly of the ADF 1A, they are conveyed further with a preset interval. The output shaft 52 is in connection to the first rotational shaft 31 of the feed roller 5, with the placement of a coupling 55 between the output shaft 52 and first rotational shaft 31. The first rotational shaft 31 of the feed roller 5, and the rotational shaft 32 of the pickup roller 4 are in connection to each other by way of the gear train 54. Thus, as the feed roller 5 rotates, the pickup roller 4 also rotates with the feed roller 5.

Figure 5:
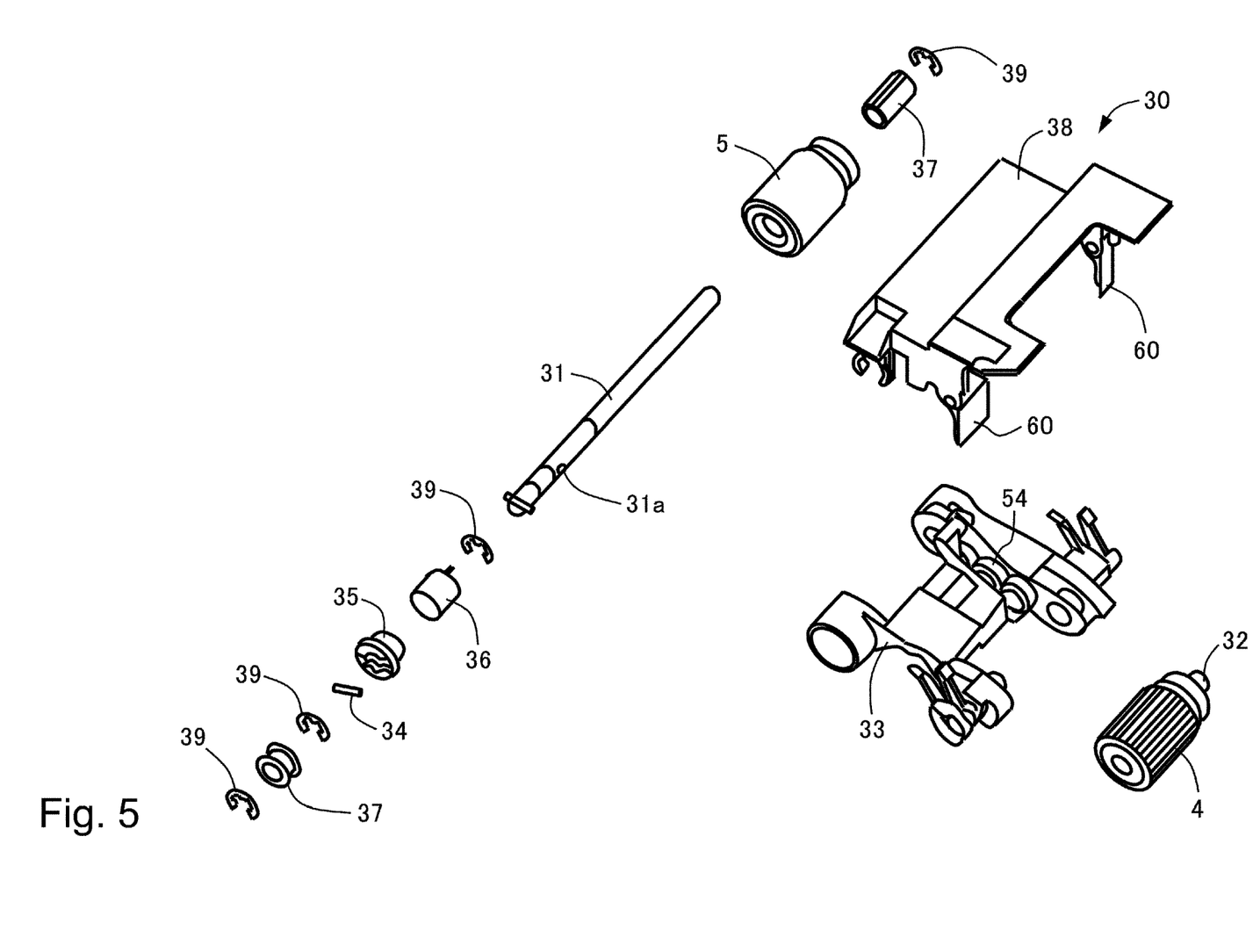
FIG. 5 is an exploded perspective view of the feed roller unit of the ADF in the preferred embodiment.

Next, referring to FIGS. 4(a) and 5, the pickup roller unit 30 includes the pickup roller 4, and an arm 33 with which the feed roller 5 is provided. The pickup roller 4 is rotatably supported by the arm 33. The arm 33 is pivotally movable about the first rotational shaft 31, which is an example of sheet conveyance roller. It pivotally moves with the first rotational shaft 31. In a case where the feed roller 5 rotates in the first direction R1, in which it conveys a document D, the arm 33 pivotally moves toward the document tray 2. In a case where the feed roller 5 pivotally moves in the second direction R2, which is opposite from the first direction R1, the arm 33 pivotally moves in the direction to move away from the document tray 2.

The pickup roller 4 is rotatably held by the arm 33. As the arm 33 is pivotally moved, the pickup roller 4 is placed in contact with, or moved away from, the top surface of the top document D in the document tray 2. The pickup roller 4 feeds the top document D in the document tray 2 into the main assembly of the ADF 1A by rotating in contact with the top surface of the document D. As the document D is delivered to the feed roller 5 from the pickup roller 4, the feed roller 5 conveys the document D further by its rotation. The feed roller 5 is rotatably supported by the first rotational shaft 31. It rotates with the first rotational shaft 31.

Next, the arm 33 is described about its pivotal movement. The arm 33 is pivotally movable by the first rotational shaft 31, with the presence of a pin 34 attached to (put through) the first rotational shaft 31, a joint 35 which is made to pivotally move with the first rotational shaft 31 by the pin 34, and a clutch spring 36 for providing the pickup roller 4 with a preset amount of document conveyance force. The pin 34 is provided to make the arm 33 rotate with the first rotational shaft 31. It is an example of pin put through the first rotational shaft 31 in the direction which is intersectional to the first rotational shaft 31. It is equivalent to a point of contact. In this embodiment, the pin 34 is put through a through hole 31a cut through the first rotational shaft 31 in the direction which is perpendicular to the first rotational shaft 31. The clutch spring 36 is fixed to the arm 33 by one end. The other end of the clutch spring 36 is fixed to the joint 35, in such a manner that as the first rotational shaft 31 rotates in the first direction R1 relative to the joint 35, the clutch spring 36 is twisted in the direction to be unwound. Therefore, the first rotational shaft 31 is enabled to rotationally move relative to the joint 35 if it is subjected to a preset amount of torque or greater.

As the first rotational shaft 31 is rotated in the first direction R1, the clutch spring 36 is subjected to a certain amount of torque. Until the amount of torque exceeds a preset value, the first rotational shaft 31 makes the arm 33 move toward the document tray 2. However, as the first rotational shaft 31 rotates further in the first direction R1 it makes the pickup roller 4 come into contact with the document D in the document tray 2, or the document tray 2. Consequently, the arm 33 is subjected to the reaction force. If the amount of this reaction force exceeds a preset value, the clutch spring 36 slips relative to the joint 35. Therefore, even though the pickup roller 4 continues to rotate, the arm 33 does not pivotally move. On the other hand, in a case where the first rotational shaft 31 rotates in the second direction R2, which is opposite from the document conveyance direction, the arm 33 pivotally moves in the direction to wind the clutch spring 36. Therefore, the arm 33 pivotally moves with the first rotational shaft 31.

The pickup roller unit 30 is provided with a holder 38 to which the cover 23a is attached. The first rotational shaft 31 is fitted with a bearing 37. It is rotatable supported by the bearing 37, with the placement of the bearing 37 between it and holder 38. Further, the first rotational shaft 31 is fitted with the clutch spring 36, joint 35, and bearing 37, which are held to the first rotational shaft 31 with the use of several E-rings 39.

The holder 38 is provided with a stopper 60 for positioning documents D in terms of the document conveyance direction as the documents D are placed in the document tray 2. When the pickup roller 4 is in its standby position (FIG. 7(a)) in which it does not contact the document tray 2, the stopper 60 is held so that it does not pivotally move in the document conveyance direction, functioning as document positioning portion. On the other hand, when the pickup roller 4 is in the feeding position (FIG. 7(b)) in which it moves toward the document tray 2, the stopper 60 is allowed to pivot in the document conveyance direction, and therefore, does not interfere with document conveyance.

Next, referring to FIG. 4(b), the separation roller unit 40 is described. Referring to FIG. 4(b), the separation roller unit 40 includes the separation roller 6, a second rotational shaft 41, which is an example of the second shaft, and a torque limiter 42. The separation roller 6 is rotatably supported by the second rotational shaft 42, which is coaxial with the separation roller 6. It is rotatably in contact with the feed roller 5. It forms a nip N (FIG. 6) between itself and feed roller 5 so that as a document D is delivered to the separation roller 6 by the pickup roller 4, it is conveyed further by being pinched between the feed roller 5 and separation roller 6.

There is positioned a torque limiter 42 between the separation roller 6 and second rotational shaft 41. The separation roller unit 40 is designed so that if the amount of torque to which the separation roller 6 is subjected while the separation roller 6 is rotating in the third direction R3 for document conveyance exceeds a preset value, the separation roller 6 is allowed to rotate about the second rotational shaft 41. In this embodiment, the torque limiter 42 has a torsional spring, which is an example of kinetic energy storing means. Because there is the torque limiter 42 between the separation roller 6 and second rotational shaft 41, if two or more documents D are delivered to the nip N, the separation roller 6 stops rotating, or rotates in the opposite direction from the document conveyance direction to separate the documents which are in contact with the feed roller 5. That is, in a case where it is only one document D that has just been delivered to the nip N (FIG. 6), the torque limiter 42 simply allows the separation roller 6 to be rotated by the movement of the document D in the nip N. On the other hand, in a case where two more documents D are delivered in layers to the nip N, it cumulatively stores the kinetic energy in its torsional spring while allowing the separation roller 6 to be rotated by the movement of the document D until the amount of kinetic energy stored in the coil spring reaches a preset value. Then, as soon as the amount of kinetic energy stored in the coil spring reaches the preset value, the torque limiter 42 begins to prevent the separation roller 6 from being rotated by the movement of the document D. The separation roller unit 40 is provided with a separation roller holder 43 for attaching the second rotational shaft 41 to the document conveying portion 23 by supporting the second rotational shaft 41. A part of the separation roller holder 43 functions as a guiding surface for guiding a document D while the document D is conveyed along the separation roller holder 43.

[Structure of Joint Between First Rotational Shaft and Arm in Comparative ADF]

Figure 8:
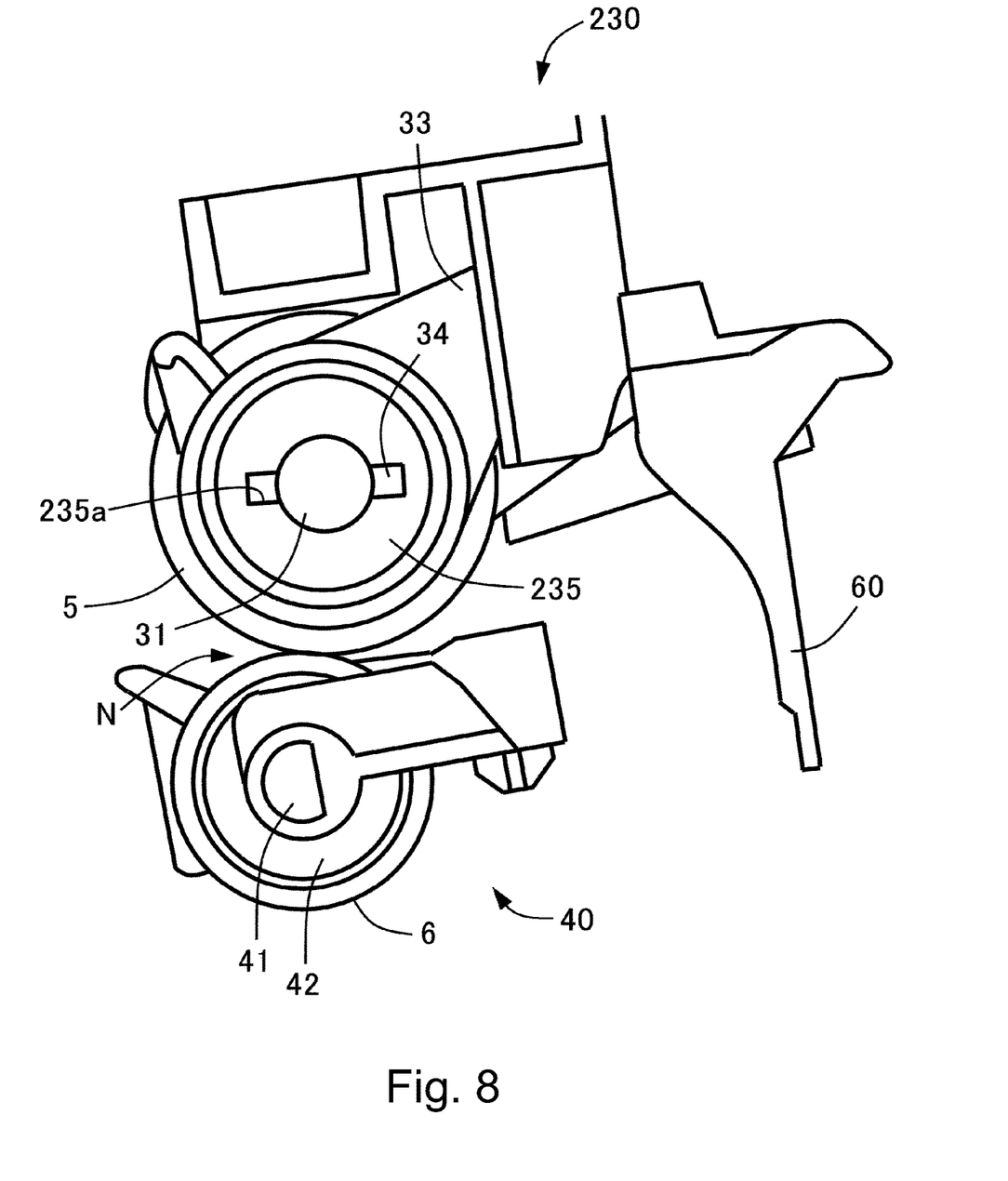
FIG. 8 is a side view of a combination of the conveyance roller and separation roller of an example of comparative (conventional) ADF.

FIG. 8 shows the joint portion as a transmission portion between the first rotational shaft 31 and arm 33 of the pickup roller unit 230 of an example of comparative ADF. The first rotational shaft 31 is provided with the pin 34, which is put through the first rotational shaft 31. The pin 34 is placed in a groove 235a, with which the joint 235 is provided. The width of this groove 235a of the joint 235 is set to be equal to the width of the pin 34. Therefore, the amount of play between the lateral wall of the groove 235a of the joint 35, and pin 34 is no more than the amount of tolerance in the measurements of these components in terms of the rotational direction of the first rotational shaft 31. Therefore, the rotation of the first rotational shaft 31 is roughly synchronous with that of the joint 35.

Figure 9:
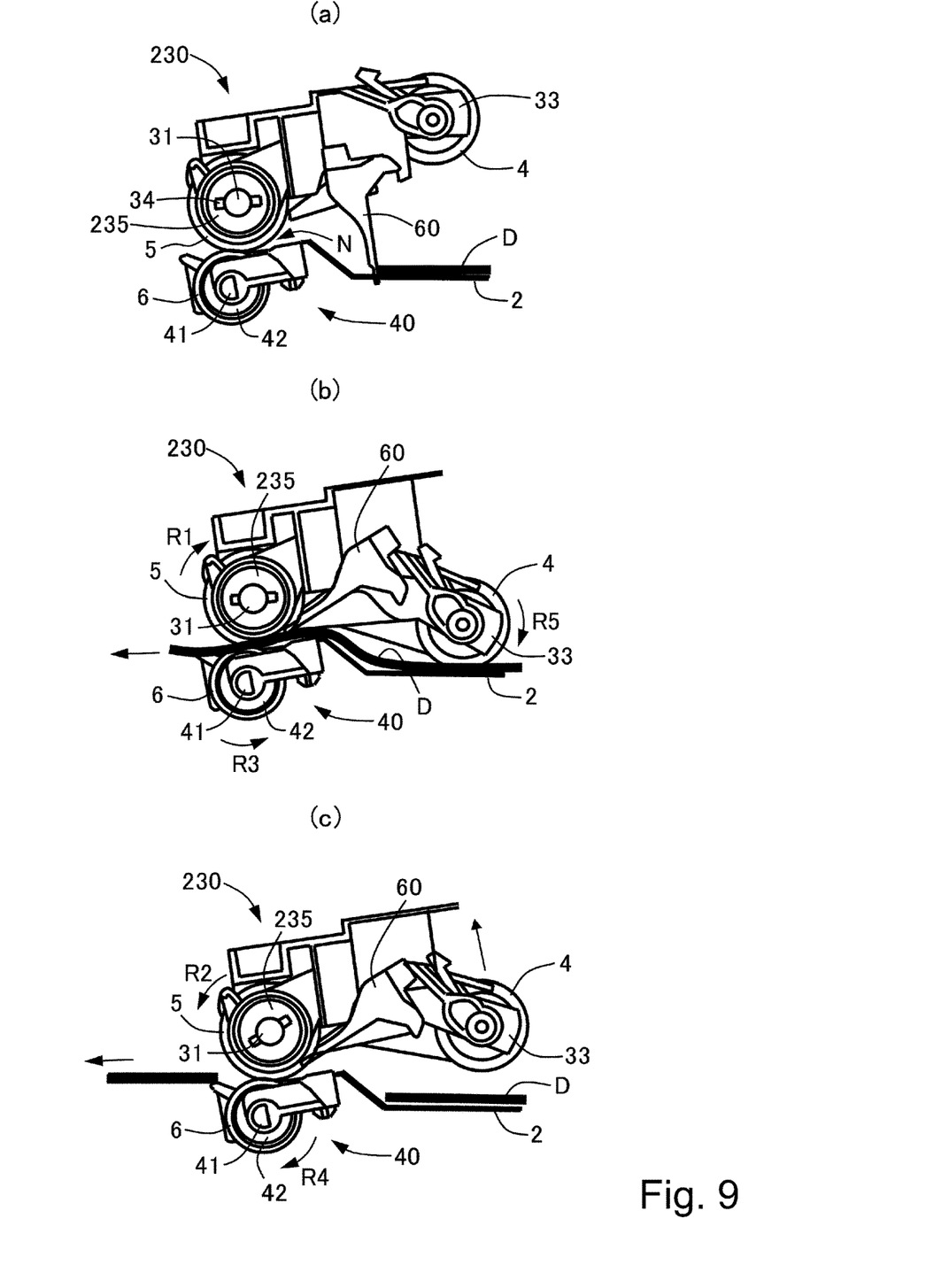

FIGS. 9(a)-9(c) show the movement of the joint 235, which occurs while documents D are conveyed by the pickup roller unit 230 of the comparative ADF. FIG. 9(a) shows the state of the pickup roller unit 230 when documents D are in the document tray 2, but the pickup roller 4 is yet to be lowered to the documents (document tray 2). When the pickup roller unit 230 is in the state shown in FIG. 9(a), the arm 33 is in its standby position, and the stopper 60 is regulating the documents D in the position of their leading edges. FIG. 9(b) shows the movement of the joint 235 which occurs as the pickup roller 4 begins to convey the documents D. The first rotational shaft 31 is rotated in the first direction R1 by the driving force from the document conveying portion 23. The driving force from the document conveying portion 23 is transmitted through an electromagnetic clutch 53 (FIG. 3), which is on the upstream side of the first rotational shaft 31 in terms of the driving force transmission direction. That is, when the electromagnetic clutch 53 is remaining engaged, the driving force is transmitted to the first rotational shaft 31, whereas when the electromagnetic clutch 53 is remaining disengaged, the driving force is not transmitted to the first rotational shaft 31. As the driving force is transmitted, the pickup roller 4 is moved to the document conveying position in which it contacts the top surface of the topmost document D in the document tray 2. Thus, the stopper 60 is freed. Therefore, it becomes possible for the document D to be conveyed downstream.

The pickup roller 4 rotates in the document conveyance direction R5 while being made by the clutch spring 36 to generate a document conveyance pressure in the direction to press on the document D. As long as the first rotational shaft 31 is rotating, the pickup roller 4 continues to generate this document conveyance force. During this period, if the number of the documents D which is moving through the nip N in the direction which is parallel to the line which coincides with the nip N and is tangential to both the feed roller 5 and separation roller 6 is one, the separation roller 6 rotates in the third direction R3 in synchronism with the feed roller 5. If two documents D arrive at the nip N in a manner to be tangent to both the feed roller 5 and separation roller 6, the separation roller 6 does not rotate, preventing the next bottom document D from being conveyed. Therefore, the documents D in the document tray 2 are fed one by one into the main assembly of the ADF 1A.

FIG. 9(c) shows the state of the pickup roller unit 30 after the feeding of documents D by the pickup roller 4 and feed roller 5 ended. As the feeding ends, the electromagnetic clutch 53 is disengaged, and therefore, the driving force from the document conveying portion 23 is not transmitted to the first rotational shaft 31. Thus, the first rotational shaft 31 stops rotating. During this period, the torque limiter 42, with which the second rotational shaft 41 is provided, is rotated by the resiliency of the torsional spring in the torque limiter 42 in the fourth direction R4, which is opposite from the third direction R3. Thus, the feed roller 5 is rotated in the second direction R2, which is opposite from the first direction R1, by the torque limiter 42. As the feed roller 5 rotates in the second direction R2, the arm 33 is made to pivot by the joint 235 toward the standby position in the direction (indicated by arrow mark in FIG. 9(c)) to move away from the documents D in the document tray 2. It is when the pickup roller unit 30 is in the state shown in FIG. 9(c) that the electromagnetic clutch 53 is engaged to feed the next document D into the main assembly of the ADF 1A. As the electromagnetic clutch 53 is engaged, the first rotational shaft 31 rotates in the first direction R1. Thus, the pickup roller 4 is moved toward the document D in the document tray 2, and comes into contact with the document D in a manner to pound on the document D, generating noises. Therefore, as the pickup roller 4 comes into contact with the document D, noises are generated. In this embodiment, therefore, in order to reduce the ADF 1A in the amount of the noises which its pickup roller 4 causes as the pickup roller 4 comes into contact with the document D, the portion of the driving force transmission route, which is between the feed roller 5 and arm 33, is provided with play.

[Structure of Joint Between First Rotational Shaft and Arm of Pickup Roller Unit in This Embodiment]

Figure 6:
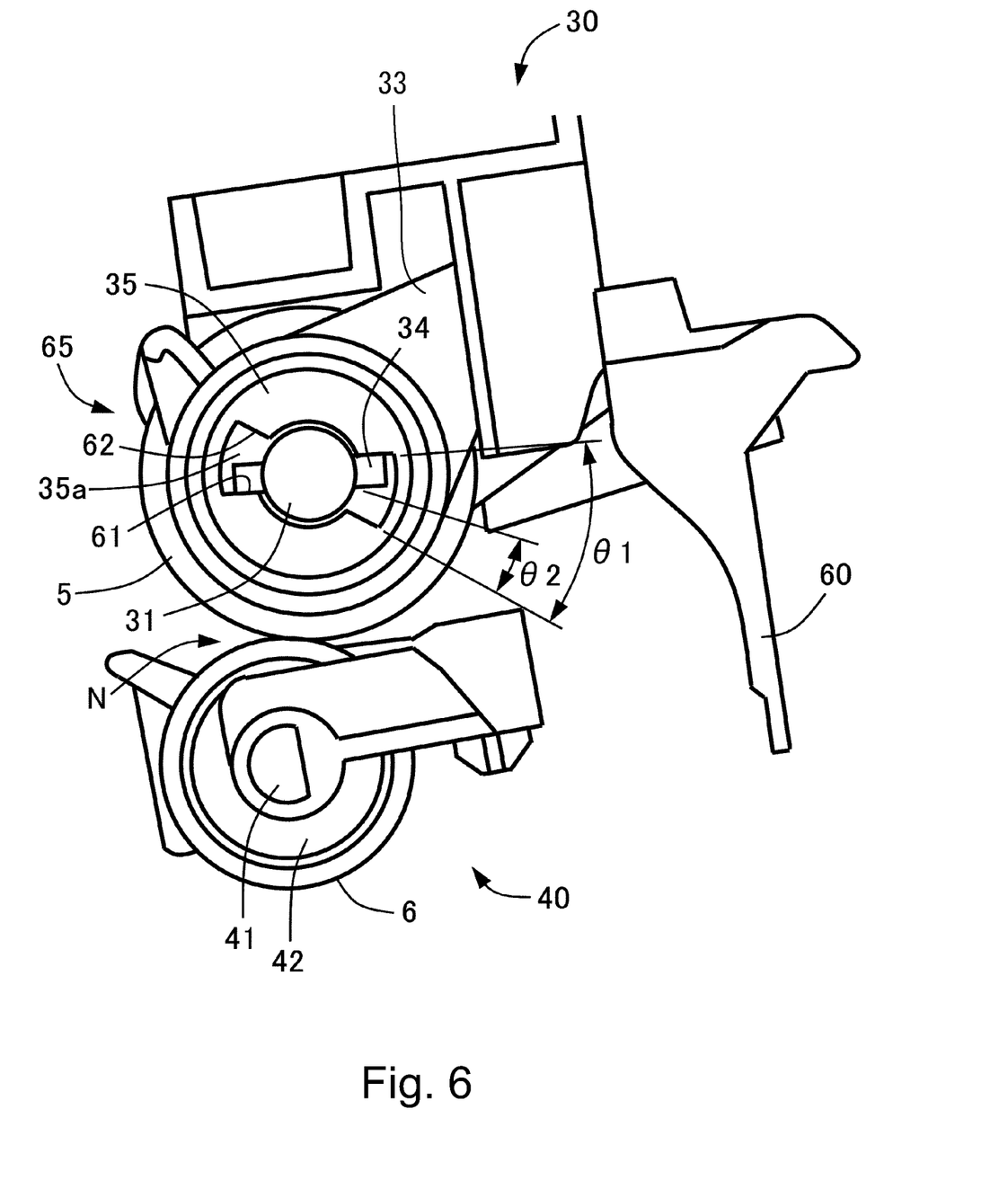
FIG. 6 is a side view of a combination of the conveyance roller and separation roller of the ADF in the preferred embodiment.

FIG. 6 shows the joint 65 between the first rotational shaft 31 and arm 33 in this embodiment. The first rotational shaft 31 is fitted with a pin 34, which was inserted in the through hole of the shaft 31. As the pickup roller unit 30 is assembled, the pin 34 fits into the groove 35a, with which the joint 35 is provided. More specifically, the joint 35 is provided with two grooves 35a, which are symmetrically positioned with reference to the axial line of the first rotational shaft 31, being therefore apart from each other by 180° in terms of the circumferential direction of the first rotational shaft 31. In terms of a cross-sectional view which is perpendicular to the axial line of the first rotational shaft 31, each groove 35a is shaped like a fan, and its lateral walls function as the first and second regulating portions 61 and 62, respectively. In this embodiment, the interval between the first and second regulating portions 61 and 62 in terms of the circumferential direction of the first rotational shaft 31, that is, the angle θ of the groove 35a is 30° (θ=30°).

In terms of the circumferential direction of the first rotational shaft 31, the dimension of the groove 35a of the joint 35 is set to be greater than the diameter of the pin 34. Therefore, a play θ2 is provided between the pin 34 and the lateral walls of each groove 35a, in terms of the circumferential direction of the first rotational shaft 31. It is desired that the play θ2 is no less than 5°. In the present invention, the play θ1 is set to 30° (θ1=30°). However, from the standpoint of ensuring that the play θ2 becomes large enough, it is desired that the angle θ1 is set according to the amount of resiliency of the torsional spring of the torque limiter 42. In this embodiment, each groove 35a of the joint 35 is shaped like a fan in terms of its cross-section which is perpendicular to the first rotational shaft 31, to ensure that the pin 35 comes into contact with each of the lateral walls of the groove 35a of the joint 35 by the entire length of its peripheral surface in terms of the lengthwise direction of the pin 35. This embodiment, however, is not intended to limit the present invention in scope in terms of the shape of each groove 35a. That is, all that is required by the present invention is that play is provided between the pin 34 and the lateral walls of each groove 35a. That is, the groove 35a does not need to be fan-shaped.

Figure 7:
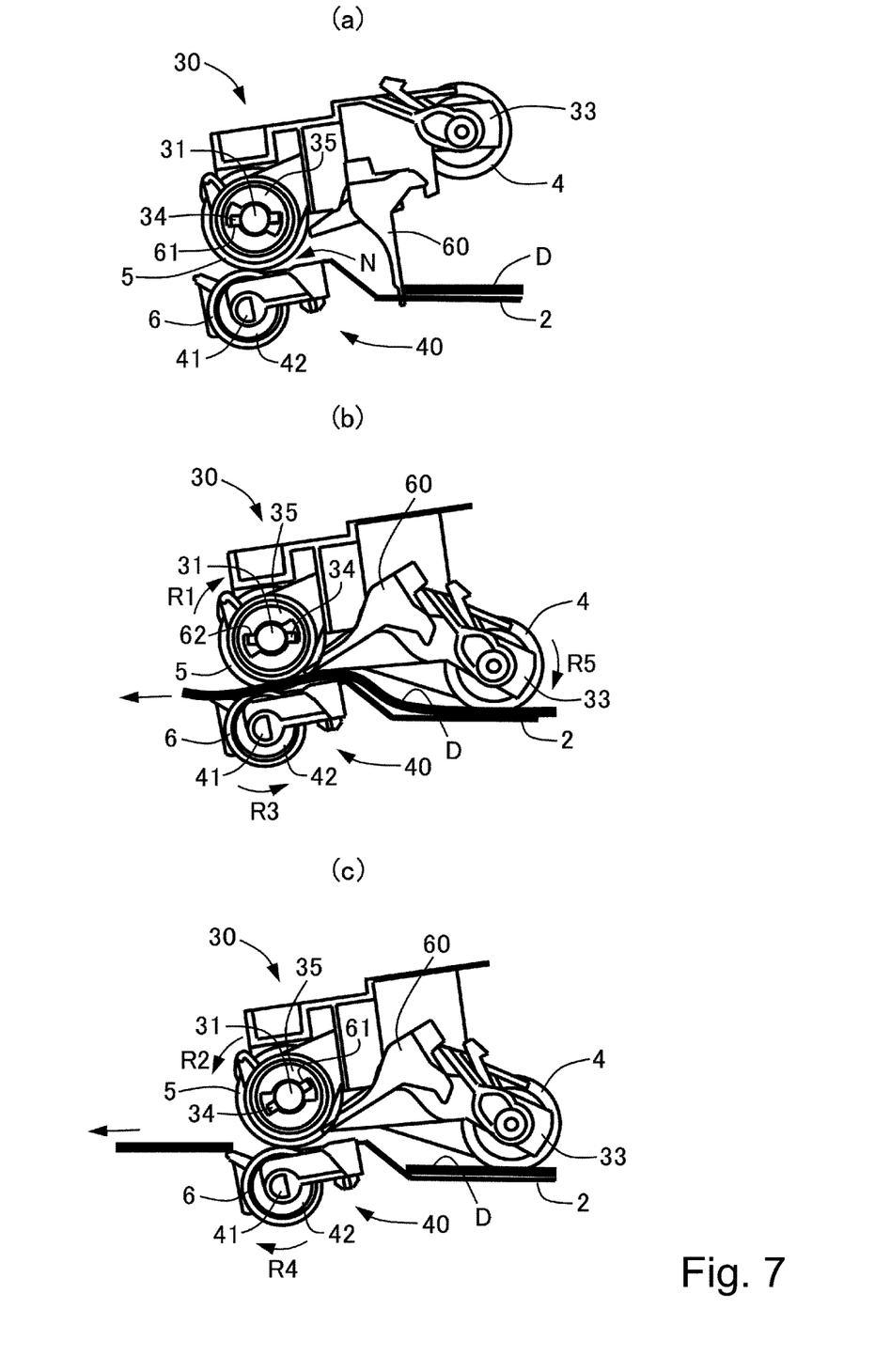

FIGS. 7(a)-7(c) show the movements of the joint 35 which occur while a document D is conveyed in the pickup roller unit 30 in this embodiment. FIG. 7(a) shows the state of the pickup roller unit 30 when documents D are in the document tray 2, but, have not begun to be conveyed. When the pickup roller unit 30 is in this state, the arm 33 is in its standby position, and the stopper 60 is regulating the documents D in position by the leading edges of the documents D. FIG. 7(b) shows the movements of the joint 35, which occur during the conveyance of the documents D by the pickup roller 4. In this case, driving force is transmitted to the first rotational shaft 31 from the document conveyance portion 23. Thus, the first rotational shaft 31 rotates in the first direction R1, and the pickup roller 4 moves to the document conveyance passage, in which it contacts the top surface of the topmost document D in the document tray 2. Thus, the stopper 60 is unlocked, making it possible for the documents d to be conveyed downstream.

As for the pickup roller 4, it rotates in the document conveyance direction R5 while being made by the clutch spring 36 (FIG. 5), which is between the arm 33 and joint 35, to press on the documents D and generate a preset amount of pressure in the document conveyance direction. While the first rotational shaft 31 rotates, the pickup roller 4 continues to generate this document conveyance pressure. As for the movement of the separation roller 6, it is the same as that in the case of the comparative pickup roller unit 30, and therefore, is not described in detail.

FIG. 7(c) shows the state of the pickup roller unit 30 after the completion of the conveyance of the documents D by the combination of the pickup roller 4 and feed roller 5. In this state, the electromagnetic clutch 53 remains disengaged, preventing thereby the document conveying portion 23 from supplying the first rotational shaft 31 with driving force. Therefore, the first rotational shaft 31 stops rotating. As for the torque limiter 42, with which the second rotational shaft 41 is provided, it is made by the resiliency of the torsional spring in the torque limiter 42, to rotate in the fourth direction R4, which is opposite from the third direction R3. Thus, the feed roller 5 is made, by this rotation of the torque limiter 42, to rotate in the second direction R2, which is opposite from the first direction R1. As the pickup roller 4 rotates in the second direction R2, the first rotational shaft 31 also rotates. However, play is provided between the pin 34 and joint 35. Therefore, the rotation of the pin 34 does not transmit to the joint 35. Therefore, the arm 33 does not move out of its standby position. Therefore, the pickup roller 4 does not move away from the top surface of the next document D in the document tray 2. Therefore, it does not occur that as the pickup roller 4 lands on the document D in the document tray 2, noises are generated.

In this embodiment, the connective portion 65 includes the grooves 35a of the joint 35, and the pin 34. That is, in this embodiment, the connective portion 65 is between the first rotational shaft 31 and arm 33. The connective portion 65 is in the rotational force transmission path, which is between the feed roller 5 and arm 33. It makes it possible for the arm 33 to pivotally move, or not move, with the feed roller 5. The connective portion 65 is provided with play θ2, in terms of the rotational direction of the connective portion 65, which is greater than the angle by which the feed roller 5 is rotated in the second direction R2 by the separation roller 6 while the torque limiter 42 changes in state from the one in which its torsional coil spring is remaining wound up, to the one in which it remains unwound. Therefore, even if the feed roller 5 is rotated in the second direction R2 by the separation roller 6, the arm 33 is prevented from pivotally moving toward its standby position.

Further, in terms of the rotational direction of the first rotational shaft 31, the angle θ2 of the play is equal to the angle of the gap which occurs between the pin 34 and the first regulating portion 61 when the pin 34 is in contact with the second regulating portion 62, or the gap which occurs between the pin 34 and the second regulating portion 62 when the pin 34 is in contact with the first regulating portion 61. In the case of this embodiment, it is no less than 5°. By the way, if the angle θ2 of play is no more than 5°, it is possible that when the feed roller 5 is rotated in the second direction R2 by the separation roller 6, the pivotal movement of the arm 33 cannot be satisfactorily prevented. This is why the angle θ2 of play is desired to be no less than 5°. Preferably, the angle θ2 of play is desired to be no less than 10°. It is more desirable for the angle θ2 of play to be no less than 10°. That is, the connective portion 65 is desired to be structured so that the first rotational shaft 31 and arm 33 are allowed to move relative to each other by no less than 5° in terms of the rotational direction of the first rotational shaft 31.

Further, in this embodiment, the combination of the joint 35 and clutch spring 36 is an example of connective portion between the first rotational shaft 31 and arm 33 and constitutes a one-way clutch. In the case of this embodiment, the connective portion 65 is between the joint 35 and first rotational shaft 31. When the first rotational shaft 31 rotates in the first direction R1, the joint 35 makes the arm pivotally move toward the document tray 2. Then, as the pickup roller 4 comes into contact with the document tray 2 or the topmost document D in the document tray 2, the joint 35 begins to allow the arm 33 to rotate or idle about the first rotational shaft 31. However, when the first rotational shaft 31 rotates in the second direction R2, the joint 35 makes the arm 33 pivotally move in the direction to move away from the document tray 2.

As described above, in the case of the ADF 1A in this embodiment, even if the feed roller 5 is rotated in the fourth direction R4 by the resiliency of the torsional coil spring of the torque limiter 42, and therefore, the feed roller 5 rotates in the second direction R2, the arm 33 is prevented from pivotally moving. Therefore, the pickup roller 4 does not move away from the top surface of the next document D in the document tray 2. Therefore, the noises associated with the banging of the document tray 2 or the document D in the document tray 2 by the pickup roller 4 do not occur. In addition, the connective portion 65 is simple in structure. In other words, the present invention can provide an ADF which does not generate the noises associated with the banging of the documents D in the document tray 2 by the pickup roller 4, and yet, is no greater in component count and size than any conventional ADF.

[Miscellanies]

Figure 10:
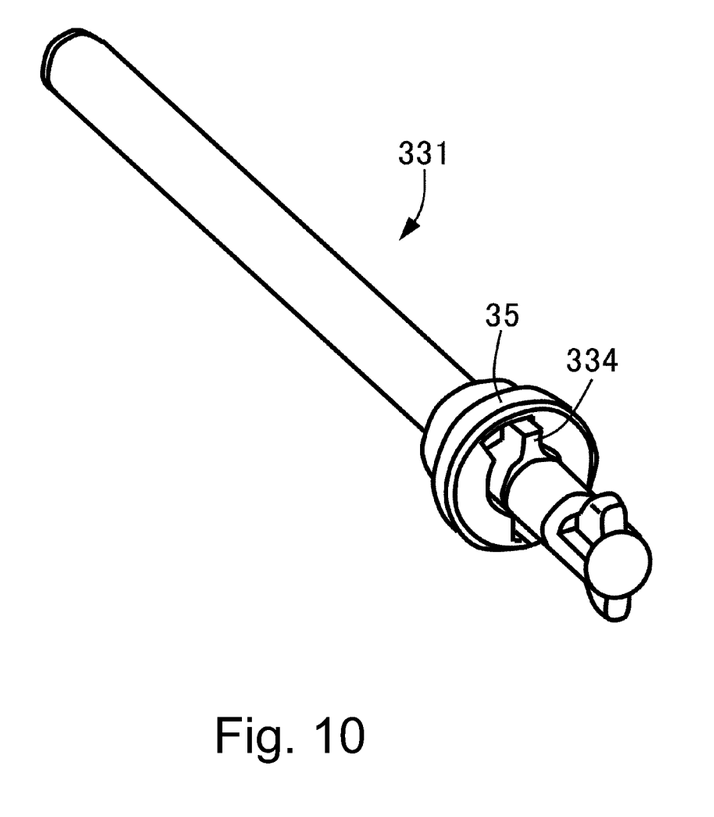
FIG. 10 is a perspective view of one of the modified versions of the first rotational shaft for the ADF.

In the embodiment of the present invention described above, the first rotational shaft 31 and pin 34 are independently formed from each other. This embodiment, however, is not intended to limit the present invention in scope in terms of the constructional relationship between of the first rotational shaft 31 and pin 34. For example, referring to FIG. 10, a first rotational shaft 311 and contacting portion 334 may be formed of a resinous substance, as parts of a monolithic component, as long as they can be satisfactorily made in terms of physical strength.

Further, in the embodiment described above, the arm 33 is provided with the first and second regulating portions 61 and 62, and the first rotational shaft 31 is fitted with the pin 34. This embodiment, however, is not intended to limit the present invention in scope. The relationship may be opposite. That is, the first rotational shaft 31 and arm 33 are formed so that one of the first rotational shaft 31 and arm 33 is provided with the first and second regulating portions so that the first and second regulating portions rotate with one which is provided with them, and the other is provided with the contacting portion, which is the pin 34, so that the contacting portion rotates with the other.

Moreover, in the embodiment described above, the connective portion 65 is structured so that the pin 34 fits in each groove 35a. This embodiment, however, is not intended to limit the present invention in scope. That is, the connective portion 65 may be differently structured from the one in the embodiment described above. Further, in the embodiment described above, the connective portion 65 is between the first rotational shaft 31 and arm 33. This embodiment, however, is not intended to limit the present invention in scope in terms of the positioning of the connective portion 65. That is, the connective portion 65 may be placed in the different position from the one in the embodiment described above, as long as the different position is somewhere between the feed roller 5 and arm 33.

Further, in the embodiment described above, the torque limiter 42 is provided with a torsional coil spring, which is an example of means for storing kinetic force. This embodiment, however, is not intended to limit the present in scope in terms of the choice of torque limiter 42. For example, a torque limiter, the means of which for storing kinetic energy is a leaf spring or one of the other springs than a coil spring may be employed in the place of the torque limiter 42.

Further, in the embodiment described above, the structural arrangement of the connective portion 65, which is in accordance with the present invention was applied to the ADF 1A. This embodiment, however, is not intended to limit the present invention in scope. For example, the structural arrangement for the connective portion 65 in accordance with the present invention may be applied to any portion of an image forming apparatus, which conveys a document. For example, it may be applied to the portion of an image forming apparatus, which automatically feeds documents into the main assembly of the image forming apparatus, or the manual document feeding portion of an image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-020189 filed on Feb. 7, 2020, which is hereby incorporated by reference herein in its entirety.

What is claimed is:

1. A document conveying apparatus comprising:
   a document placement portion configured to place documents;
   a feed roller configured to feed the document by rotating in contact with a surface of the documents placed said on the document placement portion;
   a first conveyance roller configured to covey the documents fed by the feed roller;
   a conveyance roller shaft configured to rotatably support the first conveyance roller;
   an arm portion, provided rotatably about the conveyance roller shaft, configured to rotatably move the feed roller to a standby position where the feed roller is away from the document placed on the document placement portion and to a feeding position where the feed roller is contact with and feeds the document placed on the document placement portion;
   a transmission portion, provided between the conveyance roller shaft and the arm portion, configured to transmit rotation of the conveyance roller shaft to the arm portion;
   a separation roller, forming a nip portion by pressing on the first conveyance roller, configured to separate the document fed by the feed roller;
   torque limiter configured to apply a load to rotation of the separation roller; and
   a second conveyance roller configured to convey the document separated by the first conveyance roller and the separation roller;
   wherein the feed roller and the first conveyance roller rotate in a conveyance direction of the document when the conveyance roller shaft rotates in a first direction, and the feed roller moves from the feeding position to the standby position when the conveyance roller shaft rotates in a second direction opposite to the first direction, and wherein when a rear edge of the document fed by the second conveyance roller and rotating the separation roller in a predetermined direction moves through the nip portion, the transmission portion does not transmit rotation of the first conveyance roller rotated in the second direction by the separation roller rotating in a opposite direction opposite to the predetermined direction to the arm portion by operation of the torque limiter.

2. A document conveyance apparatus according to claim 1, wherein the transmission portion is provided with play so as not to transmit rotation of the first conveyance roller rotated in the second direction by the separation roller rotating in the opposite direction to the arm portion by operation of the torque limiter.

3. A document conveyance apparatus according to claim 1, wherein when the rear edge of the document fed by the second conveyance roller and rotating the separation roller in the predetermined direction moves through the nip portion, the first conveyance roller rotated by the separation roller rotating in the opposite direction rotates in the second direction by a first rotational angel by operation of the torque limiter, and the transmission portion is provided with play of which angle is a second rotational angle more than the first rotational angle.

4. A document conveyance apparatus according to claim 1, further comprising a one-way clutch provided between the conveyance roller shaft and the first conveyance roller, wherein when the conveyance roller shaft rotates in the first direction, the conveyance roller shaft and the first conveyance roller idle each other, and wherein when the conveyance roller shaft rotates in the second direction, the conveyance roller shaft and the first conveyance roller rotate together.

5. A document conveyance apparatus according to claim 3, wherein the transmission portion is provided with the play of which the second rotational angle is no less than 5°.

6. A document conveyance apparatus according to claim 2, wherein a first regulating portion and a second regulating portion are integrally rotatably provided on one of the conveyance roller shaft and the arm portion, and disposed with a gap in a rotational direction of the conveyance roller shaft, and a contacting portion is integrally rotatably provided on the other of the conveyance roller shaft and the arm portion, and movable between the first regulating portion and the second regulating portion, and wherein when the contacting portion is in contact with and regulated by the one of the first regulating portion and the second regulating portion, the play of the transmission portion is a gap between the contacting portion and the other of the first regulating portion and the second regulating portion.

7. A document conveyance apparatus according to claim 6, wherein the arm portion is provided with a joint portion on the conveyance roller shaft side, the contacting portion is disposed on the conveyance roller shaft, and the first regulating portion and the second regulating portion are disposed on the joint portion, wherein in a case in which the conveyance roller shaft and the first conveyance roller rotate in the first direction, the arm portion pivotally moves toward the document placement portion and then the arm portion idles in relation to the conveyance roller shaft when the feed roller comes in contact with the document placement portion or the document placed on the document placement portion, and wherein in a case in which the conveyance roller shaft and the first conveyance roller rotate in the second direction, the arm portion pivotally moves away from the document placement portion.

8. A document conveyance apparatus according to claim 6, wherein the contacting portion includes a pin member provided through the conveyance roller shaft in a direction perpendicular to an axial direction of the conveyance roller shaft, wherein as seen from the axial direction of the conveyance roller shaft, the transmission portion is shape like a fun formed by the first regulating portion including a flat portion, the second regulating portion including a flat portion and an ark-shape portion, and wherein the pin member is disposed with the play within an area formed by the fun.

9. An image reading apparatus comprising:

a document conveyance apparatus according to claim 1; and an image reading portion configured to read an information of an image from a document conveyed by the document conveyance apparatus.

10. An image forming apparatus comprising:

an image reading apparatus according to claim 9; and an image forming portion, based on the information read form the document by the image reading apparatus, configured to form an image on the other document.

* * * * *